July 8, 1969        J. W. LEHMANN        3,454,301

GLARE-INHIBITING DEVICE

Filed Sept. 29, 1967

INVENTOR
JOHN W. LEHMANN

BY *Larson and Taylor*

ATTORNEYS

INVENTOR
JOHN W. LEHMANN

United States Patent Office 3,454,301
Patented July 8, 1969

3,454,301
GLARE-INHIBITING DEVICE
John W. Lehmann, 18 Evans St., Auburn, N.Y. 13021
Filed Sept. 29, 1967, Ser. No. 671,711
Int. Cl. B60j 3/00
U.S. Cl. 296—97        3 Claims

ABSTRACT OF THE DISCLOSURE

A glare-inhibiting device adaptable for use in roofed vehicles comprising separate flexible, glare-inhibiting elements and a flexible, separating member disposed between said separate glare-inhibiting elements. Each of the glare-inhibiting elements are provided with attaching means permitting separate extension and retraction of the elements in a perpendicular direction to each other to and from glare-inhibiting-position.

---

The present invention relates to a novel glare-inhibiting device adapted for use in roofed moving vehicles such as automotive vehicles. More particularly the present invention is directed to a novel glare-inhibiting device of the sun visor type characterized by its unique safety features.

Current investigations conducted to evaluate the safety of the present day automobile have not spared from severe criticism the sun visors now used. Despite the numerous incidents reported of severe head injuries caused by present sun visors, the general structure and installation of sun visors used today has remained essentially what it was in the early days of the automobile. Improvements in sun visors along this line have not been satisfactory for all to my knowledge employ rigid structures or metallic hardware in one form or other such as guides, boots, brackets, hinges, knobs, rollers, bolts with pivots, or other rigid projections, usually mounted in the roof of the vehicle in the head impact area. Also, the "cluttered up" look created by many of these proposed improvements leaves much to be desired aesthetically.

Another drawback of sun visors heretofore employed is their inability to effectively cover areas of sunlight penetration next to the windshield post and in the center of the windshield where the rear view mirror is mounted. In addition, under certain conditions such as when traveling on twisting and winding roads, sunlight frequently penetrates alternately through the corner of the windshield and the side window. Prior art shield devices fail to block out sun glare penetrating in this manner and cannot eliminate the hazard caused by such glare. It is widely apparent, therefore, that a definite need exists for an inexpensive sun visor device which will function effectively to reduce glare from areas and angles which prior art devices are incapable of covering and which does not require parts that could possibly cause bodily harm.

It is an object of the present invention, therefore, to provide a glare-inhibiting device for vehicles which eliminates the hazardous and extraneous projections which could cause injury to the driver and accompanying passengers.

It is another object of the invention to provide a glare-inhibitant which can be made to extend and retract and which can be moved laterally to the left and right to cover areas next to the windshield post and the center of the windshield.

Another object of the invention is to provide a glare-inhibiting device capable of reducing sun glare penetrating alternately through the corner of the windshield and the side windows.

A further object of the invention is to provide a glare-inhibiting device which when installed, adds to the interior beauty of the vehicle by avoiding that "cluttered-up" look and endows the "head trim" with a beautiful finish.

Yet another object of the invention is to provide a glare-inhibiting device which is extremely simple in construction, surprisingly inexpensive to manufacture and easily installed either by the manufacturer or owner.

Other objects will become evident to those skilled in the art by the following description of the invention.

The glare-inhibiting device of the invention comprises separate flexible glare-inhibiting elements a flexible, separating member disposed between said separate glare-inhibiting elements each provided with attaching means permitting separate extension and retraction of said glare-inhibiting elements to and from glare-inhibiting position and in perpendicular direction to each other.

The glare-inhibiting devices are adaptable for use in roofed vehicles, which may be land, water or air vehicles, particularly vehicles having a finished roof headliner, and adjacent front and side windows. In combination with these vehicles the glare-inhibiting device is positioned in the roof on a base support provided in said roof for said glare-inhibiting device and the glare-inhibiting elements are attached in the roof of the vehicle by the means permitting separate extension and retraction of the elements in a perpendicular direction to eath other. Slots are provided in the headliner above the adjacent front and side windows through which the respective glare-inhibiting elements of the device can be extended and retracted and the slots are of a length that permits horizontal movement of the glare-inhibiting elements when extended therethrough. As will be apparent from the description below, the glare-inhibiting device can be used to accommodate accompanying passengers as well as the driver of the vehicle.

The invention will be further described by reference to the accompanying drawings wherein.

Figure 4:
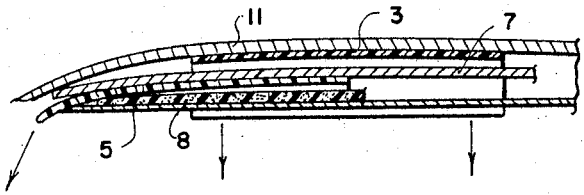
FIGURE 4 is a partial cross-section of the glare-inhibiting device taken along line 4—4 in FIGURE 3.

Referring to the drawings the glare-inhibiting device comprises a flexible glare-inhibiting element 3 and a flexible glare-inhibiting element 5 having disposed therebetween a separating member 7 (see FIG. 4). The glare-inhibiting elements 3 and 5 are preferably in sheet form and may be of any suitable flexible material unlikely to cause physical injury upon impact as for instance, during an accident or abrupt stops and starts. Particularly applicable are flexible synthetic plastic sheet materials such as sheets of polystyrene, Lustron, polyethylene, polypropylene, and similar plastic sheeting. Plastic sheeting characterized by lasting flexibility and resiliency is preferred. The separating member 7 likewise is advantageously constructed of a suitable flexible sheet material unlikely to cause injury such as the aforementioned plastic sheeting materials, soft padding or cushioning materials, paperboard and the like.

The glare-inhibiting elements 3 and 5 may be of any material which inhibits glare at least to some degree. Thus, for example, elements may be opaque, thereby serving as sun visors which shield the eyes from direct sunlight; translucent so as to allow only partial introduction of sun rays of the elements may be constructed of a transparent material but tinted or otherwise colored to merely reduce sun glare. If desired, any one or all of the glare-inhibiting elements may be cushioned or padded as, for instance, with a layer of foam rubber, polyurethane foam and the like and "finished" with a suitable covering of, for instance, vinyl plastic, cloth, leather and like materials. To provide a finished look and facilitate extension and retraction the lower extendable edge of the glare-inhibiting elements 3 and 5 may be beaded. Likewise to facilitate positioning in shield position the elements 3 and 5 may be shaped in desired manner. For example, the upper corners may be shaped as shown in FIGURE 2 to provide a neater fit with the windshield post 10.

Figure 1:
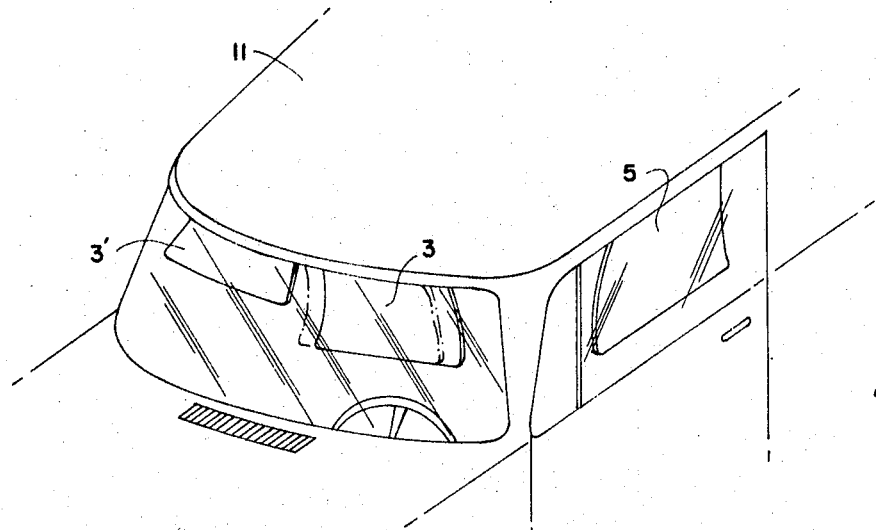
FIGURE 1 is a perspective view of the glare-inhibiting device of the invention as used in an automobile.
Figure 3:
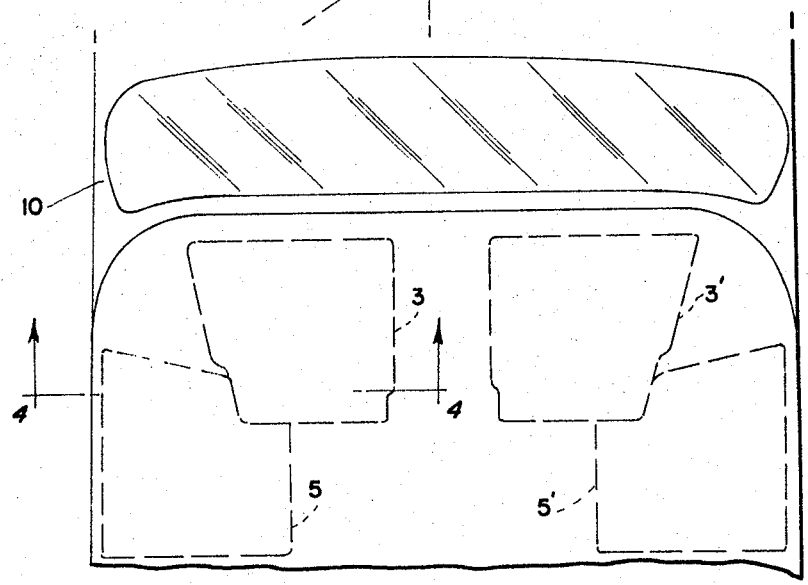
FIGURE 3 is a top elevation of the glare-inhibiting device in hidden view, positioned in the roof of an automobile.
Figure 2:
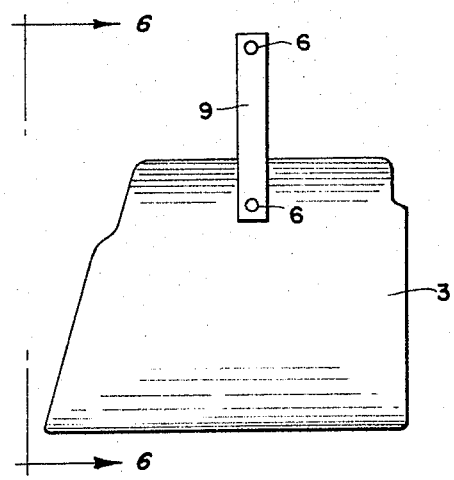
FIGURE 2 is a place view of one of the glare-inhibiting elements of the invention with attaching means.
Figure 6:
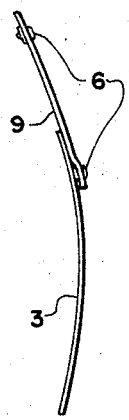
FIGURE 6 is a side elevation of FIGURE 2.

Each of the glare-inhibiting elements 3 and 5 is provided with an attaching means 9 as shown in FIGURE 2 by which it is affixed within the roof of the vehicle to permit separate extension and retraction of the elements to and from shield or glare-inhibiting position in a perpendicular direction to each other. The attaching means is preferably an elongated element of cloth, cord, tape plastic and the like, one end of which is secured to the element advantageously in a manner that positions it transversely across the rear edge of the member, that is, that edge opposite the front or withdrawn edge. The other end of the attaching means 9 may be affixed to any convenient location within the roof of the vehicle as, for instance, the roof 11 itself, the separating member 7, padding 8, etc. using any suitable fastening means such as adhesives, staples, tacks, snaps and the like. The preferred fastening means are those essentially injury-proof such as adhesives or snaps 6 as shown in FIGURES 2 and 6. One convenient attaching means for use in the present invention is an elongated adhesive-containing tape.

The length of the attaching means may vary but should be a distance from the point of attachment within the roof of the vehicle to permit extension of the glare-inhibiting element to shield or glare-inhibiting positions. An optimum distance is one which permits extension to shield distance but precludes withdrawl of the entire glare-inhibiting element from the roof, leaving a portion of the elements 3 and 5 remaining in the roof even when extended to the desired full shield position. In this manner, advantage is taken of flexible force in the glare-inhibiting elements to hold them against the shield windows as will be further described below. Also, as a preferred embodiment, the glare-inhibiting elements may be bowed or provided with a slight concave contour as shown in FIGURE 6 by any suitable means to further insure contact with the windshield and/or side windows when extended.

Figure 5:
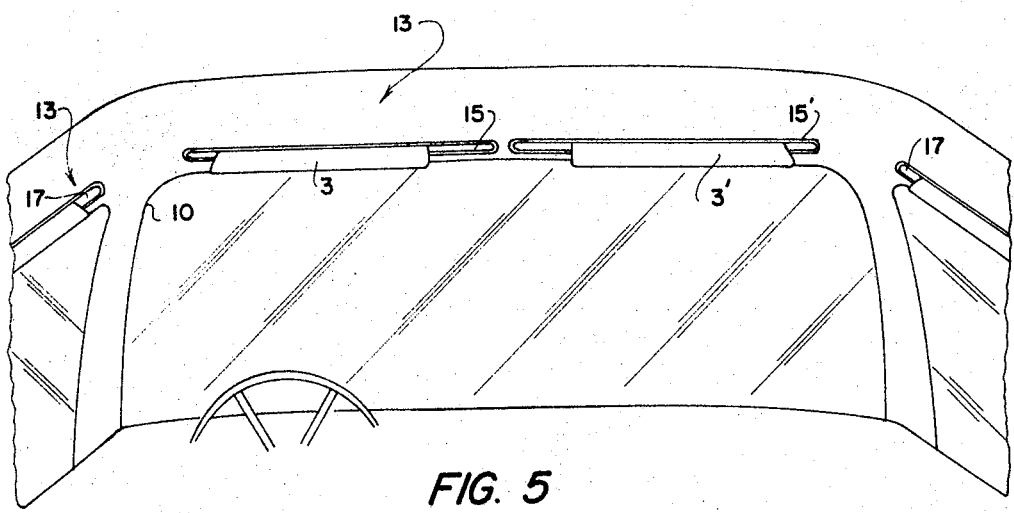
FIGURE 5 is a perspective view of the interior of the automobile showing the glare-inhibiting device in substantially raised position.

The glare-inhibiting device composed of elements 3 and 5 with separating member 7 disposed therein may be readily inserted as a package into the roof of a finished vehicle by simply removing sufficient of the roof headliner indicated generally as 13 in FIGURE 5 above the front and side windows to be shielded and positioning the device onto the holding means commonly provided roofs of vehicles onto which the headliner is sewn or otherwise attached. This holding means generally provides sufficient support for the glare-inhibiting device of the invention. The headliner above the front and side windows is provided with slots 15 and 17 through which the glare-inhibiting elements 3 and 5, respectively, can be extended and retracted. The slots 15 and 17 are advantageously of a length sufficiently greater than the length of the glare-inhibiting element extendable and retractable therethrough in order to permit horizontal movement of the respective elements 3 and 5. Proper positioning of the device in the roof of the vehicle may be effected in various ways depending primarily on personal preference. One manner comprises maneuvering the device in the roof to the point where the elements 3 and 5 can be withdrawn through the respective slots 15 and 17 and when withdrawn, are in the desired fully drawn shield position and essentially centered in the middle of each slot. While in fully drawn, centered position the respective attaching means on the elements 3 and 5 are preferably fully extended and affixed within the roof as, for instance, onto roof 7. The slots 15 and 17 are also preferentially located a convenient distance from the windows to be shielded that allows the elements to rest on the windows by virtue of the resilient force endowed the element through the slight flexing they undergo as they are extended downward through the slot.

If desired, a similar glare-inhibiting device may be provided the passenger's side of the vehicle as indicated in the drawings by glare-inhibiting elements 3' and 5', and their respective slots 15' and 17'. Likewise, the glare-inhibiting elements might additionally be provided rear sidewindows, in which instance an additional glare-inhibiting element or elements and accommodating slot or slots are appropriated in the proper rear positions.

Of course, the glare-inhibiting devices may also be installed during manufacture of the vehicle. In such manufacture, any suitable supporting base may be provided for the glare-inhibiting device in lieu of or in addition to the means supplied onto which the headliner is sewn or otherwise attached. The separating member 7 may be provided in a form, that, substantially over the entire roof width and between the respective elements 3 and 5 and 3' and 5'. In a more finished product the separating member 7, in addition to extending across the width of the roof may be fastened thereto by means of the side moldings above the side windows of the vehicle, if such are provided. Although such "finishing" in the installation of the separating member 7 of the glare-inhibiting device into a vehicle such as an automobile lends itself most readily during manufacture of the vehicle it nevertheless can also be installed with little inconvenience in already finished vehicles. It should also be understood that the separating member 7 need not extend over the substantial width of the roof but merely a sufficient distance between the glare-inhibiting members 3 and 5 and if employed as a separate separating member between glare-inhibiting members 3' and 5'.

When the glare-inhibiting device is properly positioned the glare-inhibiting elements are easily withdrawn and moved laterally either left or right to completely block out or inhibit sunlight penetrating the front and side windows regardless of the angle of penetrating sunlight. Also, in the case of sunlight coming alternately through the corner of the windshield and side window, such sun glare can be completely eliminated by sliding glare-inhibiting element 3 to the extreme left at the driver's side, sliding glare-inhibiting element 3' to the extreme right at the passenger's side and pulling down and sliding glare-inhibiting elements 5 and 5' toward the windshield.

It is claimed:

1. In combination with a moving vehicle having a roof, a roof headliner, front and side windows, a glare-inhibiting device positioned in said roof, a base support in said roof for said glare-inhibiting device, said glare-inhibiting device comprising a first flexible, plastic glare-inhibiting element, a second flexible, plastic glare-inhibiting element, a flexible, separating member between said first and second glare-inhibiting elements, slots in the roof headliner above said front and side windows each of said first and second glare-inhibiting elements being provided with attaching means in the roof of said vehicle permitting separate extension and retraction of said glare-inhibiting elements through the respective slots, said slots being of a length that permits horizontal movement of said glare-inhibiting elements when extended therethrough.

2. The combination of claim 1 wherein the flexible, separating member extends over the substantial width of the roof of said vehicle.

3. In combination with a moving vehicle having a roof, a roof headliner, front and side windows, a glare-inhibiting device disposed in said roof, a base support for said glare-inhibiting device, said glare-inhibiting device comprising a first pair of flexible, plastic, glare-inhibiting elements, a second pair of flexible, glare-inhibiting elements, a flexible, separating member between said first and second pairs of glare-inhibiting elements, slots in the headliner above said front window through which the elements of each pair of said glare-inhibiting elements atop said separating member can be extended and retracted, slots in the headliner above and opposite side windows through which the elements of each pair of said glare-inhibiting elements under said separating member can be extended and retracted, each of said slots being of a length that permits horizontal movement of the glare-inhibiting elements extended therethrough, each of said glare-inhibiting elements being attached in the roof of said vehicle by means permitting separate extension and retraction of the individual elements making up each pair of glare-inhibiting elements in a perpendicular direction to each other and through the respective slots in the headliner above said front and side windows.

References Cited

UNITED STATES PATENTS

| | | | |
|---|---|---|---|
| 827,867 | 8/1906 | Hornor | 160—37 X |
| 2,385,557 | 9/1945 | Ward | 296—97 |
| 2,596,873 | 5/1952 | Solmes | 296—97 |
| 3,008,757 | 11/1961 | Sinnett | 296—97 |

FOREIGN PATENTS 1,285,392  1/1962  France.

RICHARD J. JOHNSON, *Primary Examiner.*

J. A. PEKAR, *Assistant Examiner.*